United States Patent [19]

Donaldson et al.

[11] Patent Number: 4,947,368
[45] Date of Patent: Aug. 7, 1990

[54] LOOKAHEAD BUS ARBITRATION SYSTEM WITH OVERRIDE OF CONDITIONAL ACCESS GRANTS BY BUS CYCLE EXTENSIONS FOR MULTICYCLE DATA TRANSFERS

[75] Inventors: Darrel D. Donaldson, Lancaster; Richard B. Gillett, Jr., Westford, both of Mass.

[73] Assignee: Digital Equipment Corporation, Maynard, Mass.

[21] Appl. No.: 44,490

[22] Filed: May 1, 1987

[51] Int. Cl.$^5$ .................. G06F 13/14; G06F 13/36; G06F 13/42; G06F 15/16
[52] U.S. Cl. .................. 364/900; 364/985.4; 364/940.2; 364/935.2; 364/935.41; 364/938.2; 364/942.2
[58] Field of Search ... 364/200 MS File, 900 MS File

[56] References Cited

U.S. PATENT DOCUMENTS

| | | | |
|---|---|---|---|
| 3,665,412 | 5/1972 | Briand | 364/200 |
| 4,030,075 | 6/1977 | Barlow | 364/200 |
| 4,161,786 | 7/1979 | Hopkins et al. | 364/900 |
| 4,229,791 | 10/1980 | Levy et al. | 364/200 |
| 4,232,366 | 11/1980 | Levy et al. | 364/200 |
| 4,375,639 | 3/1983 | Johnson, Jr. | 340/825.5 |
| 4,423,384 | 12/1983 | DeBock | 328/152 |
| 4,456,956 | 6/1984 | El-Gohary et al. | 364/200 |
| 4,471,481 | 9/1984 | Shaw et al. | 370/85 |
| 4,473,880 | 9/1984 | Budde et al. | 364/200 |
| 4,476,467 | 10/1984 | Terwilliger et al. | 340/825.5 |
| 4,514,843 | 4/1985 | Albanese | 370/93 |
| 4,560,985 | 12/1985 | Strecker et al. | 340/825.5 |
| 4,571,672 | 2/1986 | Hatada et al. | 364/200 |
| 4,602,252 | 7/1986 | Nakata et al. | 340/825.5 |
| 4,622,630 | 11/1986 | Vora et al. | 364/134 |
| 4,626,843 | 12/1986 | Szeto et al. | 340/825.5 |
| 4,628,311 | 12/1986 | Milling | 340/825.5 |
| 4,638,311 | 1/1987 | Gerety | 247/19 |
| 4,644,348 | 2/1987 | Gerety | 340/825.06 |
| 4,644,496 | 2/1987 | Andrews | 364/900 |
| 4,646,232 | 2/1987 | Chang et al. | 364/200 |
| 4,652,873 | 3/1987 | Dolsen et al. | 340/825.5 |
| 4,660,169 | 4/1987 | Norgren et al. | 364/900 |
| 4,703,420 | 10/1987 | Irwin | 364/200 |
| 4,730,268 | 3/1988 | Marin | 364/900 |

FOREIGN PATENT DOCUMENTS

63945/86 5/1987 Australia .

OTHER PUBLICATIONS

IBM Corp., "High-Speed Processor Bus Arbitration", IBM Technical Disclosure Bulletin, vol. 28, No. 12, May 1986, pp. 5329-5333.
Mostek Corp., Motorola, Inc. & Signetics/Philips, "VME Bus: Specification Manual", Chapter 3, Oct. 1981, pp. 3-1 to 3-22.
IBM Technical Disclosure Bulletin, vol. 28, No. 12, "High-Speed Processor Bus Arbitration", (5/86), pp. 5329-5333.
IBM Technical Disclosure Bulletin, vol. 29, No. 3, "Round Robin Selection Device Using a Feedback Priority Encoder", (8/86), pp. 1361-1362.
H. S. Stone, "Microcomputer Interfacing", (2/83), pp. 107-110.
Tyndale-Biscoe et al., "Eurobus, An Interface Standard for Microcomputer Systems", Implementing Functions: Microprocessors and Firmware, 7th Euromicro Symposium on Microprocessing & Microprogramming, pp. 181-190.
Ser. No. 06/534,829 09221983 Bomba et al.

Primary Examiner—Archie E. Williams, Jr.
Assistant Examiner—Ayni Mohamed
Attorney, Agent, or Firm—Finnegan, Henderson, Farabow, Garrett, and Dunner

[57] ABSTRACT

A node for obtaining access to a bus. In this arbitration method, the node receives a conditional grant. The node determines whether access to the bus will actually transfer to it. The node contains distributed logic that examines an extend bus cycle signal to determine whether it can become a transmitter to transfer messages on the bus. When the node becomes a transmitter, it generates an extend bus cycle signal to maintain access to the bus when executing a multi-cycle transfer, even though other nodes, perhaps with higher priorities, require access to the bus.

16 Claims, 9 Drawing Sheets

ARBITER BLOCK DIAGRAM

LOOKAHEAD BUS ARBITRATION SYSTEM WITH OVERRIDE OF CONDITIONAL ACCESS GRANTS BY BUS CYCLE EXTENSIONS FOR MULTICYCLE DATA TRANSFERS

FIELD OF THE INVENTION

The invention relates to a method and structure for arbitrating access to a bus in a computer system.

BACKGROUND OF THE INVENTION

A computer system can include a number of separate resources, such as processors, memories, and I/O devices, in order to perform various tasks. During operation of the computer system, it is often necessary for commands and/or data to be transferred between different resources in the computer system. Typically, a system bus is provided for transferring messages between a number of resources, or nodes, in a multiple node network.

In order to effectively utilize a common system bus for transfer of messages between resources, access to the bus by each of the resources must be carefully controlled. In particular, only one resource can attempt to transfer messages onto the system bus at any one time. For example, one resource may be ready to send out a read command during a particular bus cycle, while at the same time another resource is ready to obtain access to the bus for several bus cycles in order to transmit a write command and write data.

Therefore, in every computer system including a number of nodes coupled to a common bus, some form of "arbitration" must be performed in order to determine which node obtains access to the bus. A central arbiter can be coupled to each of the bus system resources and can determine which resource will be granted access to the bus during any given bus cycle. Such a central arbiter receives separate bus requests from each of the resources at times when that resource is ready to obtain access to the bus in order to transmit a message to another resource. In response to a number of bus requests, the central arbiter sends a bus grant to only one of the requesting nodes in a predetermined manner corresponding to a priority assigned to each request.

The use of bus request signals results in more efficient utilization of the bus and the system resources. Bus access is granted to a node only when that resource is performing an operation that requires transmission of a message by that resource onto the bus.

Unfortunately, certain types of transfers from a resource to the bus cannot be completed within a single bus cycle. For example, write transfers require that the resource be given access to the bus for more than one bus cycle. The message transferred onto the bus during the first bus cycle (command cycle) of the write transfer will be a write command. During the next consecutive bus cycle, write data will be transferred onto the bus.

To accomodate such multicycle transfers, an arbitration method may be used in which a resource performing a multicycle transfer operation must transmit an activated extend bus cycle signal to the central arbiter. The central arbiter would then determine whether it has received an activated extend bus cycle signal before generating a bus grant for a selected node. In these systems, issuance of the bus grant is delayed while the central arbiter processes the activated extend bus cycle signal. If an extend bus cycle signal is activated, the central arbiter transmits the bus grant to the same resource that had access to the bus during the preceding bus cycle.

An important disadvantage exists in systems utilizing such an arbitration method. Resources in the computer system obtain access to the bus based solely on the presence of a bus grant from the central arbiter. Therefore, the performance of the system and the effective utilization of the common bus depends upon the speed with which the bus grant is transmitted to a selected resource. This arbitration method, however, requires a relatively long bus cycle time because the arbiter must wait for the receipt of the extend bus cycle signal before generating a new grant. For systems that use a single wired-OR extend bus cycle signal, this would delay the availability of the grant.

It would be undesirable, however, to solve this problem by adding additional extend bus cycle lines from the resources to the central arbiter to increase the speed at which the arbiter can determine if the previous owner of the bus should retain ownership for the next cycle. Such a solution would require the addition of several pins on the backplane to supply another interconnect from each resource to the arbiter, and such pins may not be available.

It is an object of the present invention to reduce system bus cycle time by reducing the arbitration time, thereby improving system performance.

Another object of the present invention is to provide this reduced arbitration time with only one extend bus cycle line on the back plane.

It is a further object of the invention to arbitrate between bus requests from several resources, and to have the central arbiter conditionally indicate which resource has been selected, without delaying the selection by the arbiter in order to process additional signals from resources contending for access to the bus.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the objects and in accordance with the purposes of the invention, as embodied and broadly described herein, a node is provided that is coupled to a bus which is also coupled to a plurality of other nodes and which allows messages to be transferred during one or more cycles of the bus, the node comprising: bus request means for generating a bus request at times when a message is to be transferred from the node onto the bus; extend request means for generating an extend request for the node, when it requires more than one bus cycle to transfer a message, and for maintaining the extend request during succeeding bus cycles; extend cycle means, coupled to the extend request means, for activating during an initial access cycle when the node becomes a transmitter, and for maintaining activated during succeeding bus cycles when the node is the transmitter, and extend bus cycle signal for the node, the activation and maintenance of the extend bus cycle signal occurring at times when the extend request for the node is present; and bus access means, coupled to the extend cycle means and responsive to a conditional bus grant received in response to the bus request, for generating a system bus drive enable signal level in the node when no extend bus cycle signal received from the other nodes is activated, and for maintaining the system bus drive enable signal while the extend bus cycle signal for the node is activated.

The accompanying drawings, which are incorporated in and constitute a part of this specification, illustrate one embodiment of the invention, and, together with the description, serve to explain the principles of the invention.

DETAILED DESCRIPTION OF THE PREFERRED EMBODIMENTS

Reference will now be made in detail to a preferred embodiment of the invention, an example of which is illustrated in the accompanying drawings.

A. System Overview

Figure 1:
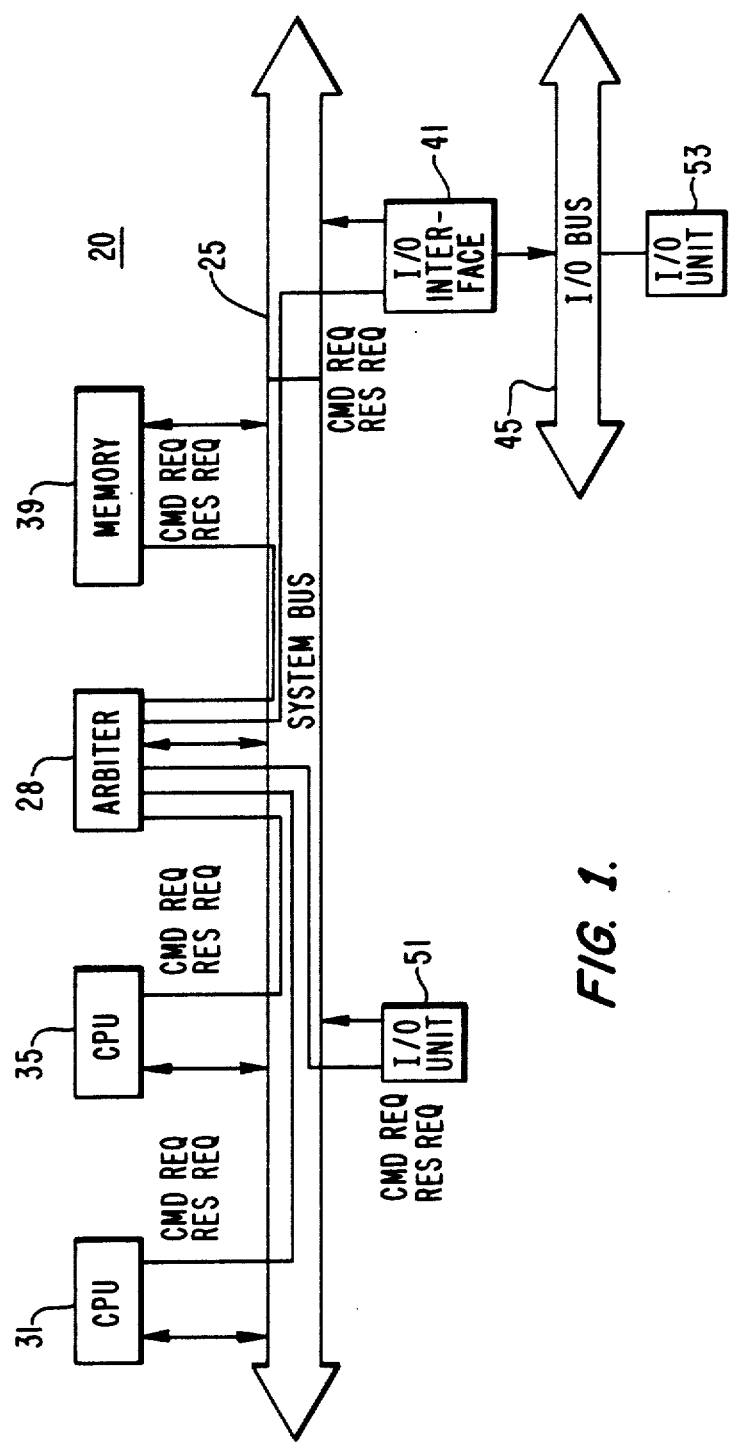
FIG. 1 is a block diagram of a data processing system using the present invention.

FIG. 1 shows an example of a data processing system 20 which embodies the present invention. The heart of system 20 is a system bus 25 which is a synchronous bus that allows communication between several processors, memory subsystems, and I/O systems. Communications over system bus 25 occur synchronously using periodic bus cycles. A typical bus cycle time for system bus 25 is 64 nsec.

In FIG. 1, system bus 25 is coupled to two processors 31 and 35, a memory 39, one I/O interface 41 and one I/O unit 51. I/O unit 53, is coupled to system bus 25 by way of I/O bus 45 and I/O unit interface 41.

A central arbiter 28 is also connected to system bus 25 in the preferred embodiment of data processing system 20. Arbiter 28 provides certain timing and bus arbitration signals directly to the other devices on system bus 25 and shares some signals with those devices.

The implementation shown in FIG. 1 is one which is presently preferred and should not necessarily be interpreted as limiting the present invention. For example, I/O unit 53 could be coupled directly to system bus 25, and arbiter 28 need not operate in the manner described for the present invention.

In the nomenclature used to describe the present invention, processors 31 and 35, memory 39, and I/O interface 41, and I/O device 51 are all called nodes. A "node" is defined as a hardware device which connects to system bus 25. A typical node 60 is shown in greater detail in FIG. 2.

According to the nomenclature used to describe the present invention, the terms "signals" or "lines" are mainly used interchangeably to refer to the names of the physical wires. The terms "data" or "levels" are mainly used to refer to the values which the signals or lines can assume.

Nodes perform transfers with other nodes over system bus 25. A "transfer" is one or more contiguous cycles that share a common transmitter and common arbitration. For example, a read operation initiated by one node to obtain information from another node on system bus 25 requires a command transfer from the first to the second node followed by one or more return data transfers from the second node to the first node at some later time.

A "transaction" is defined as the complete logical task being performed on system bus 25 and can include more than one transfer. For example, a read operation consisting of a command transfer followed later by one or more return data transfers is one transaction. In the preferred embodiment of system bus 25, the permissible transactions support the transfer of different data lengths and include read, write (masked), interlock read, unlock write, and interrupt operations. The difference between an interlock read,unlock write, and interrupt operations. The difference between an interlock read and a regular or noninterlock read is that an interlock read to a specific location retrieves information stored at that location and restricts access to the stored information by subsequent interlock read commands. Access restriction is performed by setting a lock mechanism. A subsequent unlock write command stores information in the specified location and restores access to the stored information by resetting the lock mechanism at that location. Thus, the interlock read/unlock write operations are a form of read-modify-write operation.

Since system bus 25 is a "pended" bus, it fosters efficient use of bus resources by allowing other nodes to use bus cycles which otherwise would have been wasted waiting for responses. In a pended bus, after one node initiates a transaction, other nodes can have access to the bus before that transaction is complete. Thus, the node initiating that transaction does not tie up the bus for the entire transaction time. This contrasts with a non-pended bus in which the bus is tied up for an entire transaction. For example in system bus 25, after a node initiates a read transaction and makes a command transfer, the node to which that command transfer is directed may not be able to return the requested data immediately. Cycles on bus 25 would then be available between the command transfer and the return data transfer of the read transaction. System bus 25 allows other nodes to use those cycles.

In using system bus 25, each of the nodes can assume different roles in order to effect the transfer of information. One of those roles is a "commander" which is defined as a node which has initiated a transaction currently in progress. For example, in a write or read operation, the commander is the node that requested the write or read operation; it is not necessarily the node that sends or receives the data. In the preferred protocol for system bus 25, a node remains as the commander throughout an entire transaction even though another node may take ownership of the system bus 25 during certain cycles of the transaction. For example, although one node has control of system bus 25 during the transfer of data in response to the command transfer of a read transaction, that one node does not become the commander of the bus 25. Instead, this node is called a "responder."

A responder responds to the commander. For example, if a commander initiated a write operation to write data from node A to node B, node B would be the responder. In addition, in data processing system 20 a node can simultaneously be a commander and a responder.

Transmitters and receivers are roles which the nodes assume in an individual transfer. A "transmitter" is defined as a node which is the source of information placed on system bus 25 during a transfer. A "receiver" is the complement of the transmitter and is defined as the node which receives the information placed on system bus 25 during a transfer. During a read transaction, for example, a commander can first be a transmitter during the command transfer and then a receiver during the return data transfer.

When a node connected to system bus 25 desires to become a transmitter on system bus 25, that node asserts one of two request lines, CMD REQ (commander request) and RES REQ (responder request), which are connected between central arbiter 28 and that particular node. The CMD REQ and RES REQ lines are shown generally in FIG. 1. In general, a node uses its CMD REQ line to request to become commander and initiate transactions on system bus 25, and a node uses its RES REQ line to become a responder to return data or message to a commander. Generally, central arbiter 28 detects which nodes desire access to the bus (i.e., which request lines are asserted). The arbiter then responds to one of the asserted request lines to grant the corresponding node access to bus 25 according to a priority algorithm. In the preferred embodiment, arbiter 28 maintains two independent, circular queues: one for the commander requests and one for the responder requests. Preferably, the responder requests have a higher priority than the commander requests and are handled before the commander requests.

The commander request lines and responder request lines are considered to be arbitration signals. As illustrated in FIG. 1, and as will be explained in greater detail in the description of FIG. 6, arbitration signals also include point-to-point conditional grant signals from central arbiter 28 to each node, system bus extend signals to implement multi-bus cycle transfers, and system bus suppression signals to control the initiation of new bus transactions when, for example, a node such as a memory is momentarily unable to keep up with traffic on the system bus.

Other types of signals which can constitute system bus 25 include information transfer signals, respond signals, control signals, console/front panel signals, and a few miscellaneous signals. Information transfer signals include data signals, function signals which represent the function being performed on the system bus 25 during a current cycle, identifier signals identifying the commander, and parity signals. The respond signals generally include acknowledge or confirmation signals from a receiver to notify the transmitter of the status of the data transfer.

Control signals include clock signals, warning signals, such as those identifying low line voltages or low DC voltages, reset signals used during initialization, node failure signals, default signals used during idle bus cycles, and error default signals. The console/front panel signals include signals to transmit and receive serial data to a system console, boot signals to control the behavior of a boot processor during power-up, signals to enable modification of the erasable PROM of processors 31, 35 on system bus 25, a signal to control a RUN LIGHT on the front panel, and signals providing battery power to clock logic on certain nodes. The miscellaneous signals, in addition to spare signals, include identification signals which allow each node to define its identification code.

Figure 2:
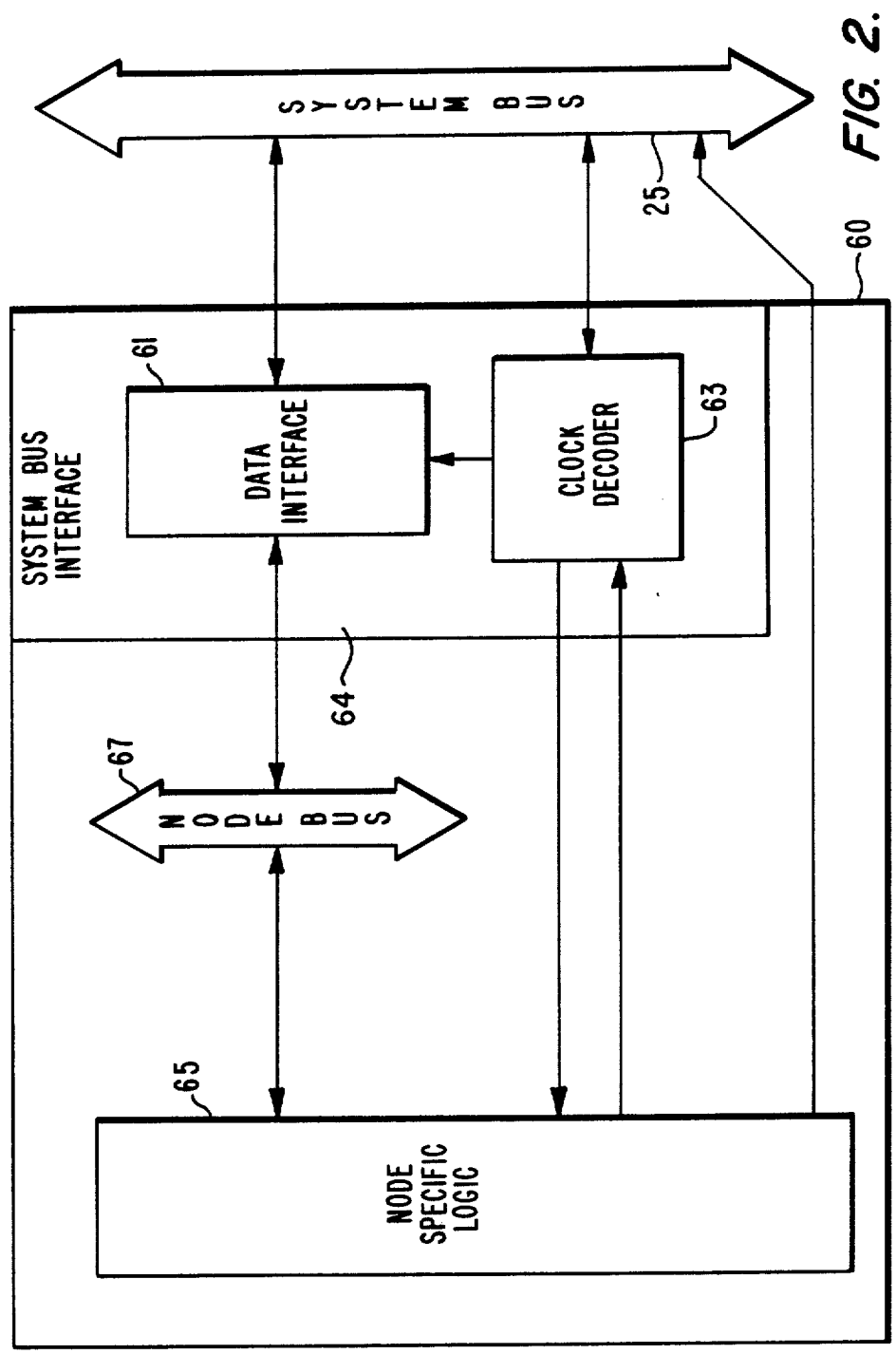
FIG. 2 is a block diagram of a node in the data processing system of FIG. 1.

FIG. 2 shows an example of a node 60 connected to system bus 25. Node 60 could be a processor, a memory, an I/O unit or an I/O interface as shown in FIG. 1. In the example shown in FIG. 2, node 60 includes node specific logic 65, a node bus 67, and a system bus interface 64 containing a data interface 61 and a clock decoder 63. Preferably, data interface 61, clock decoder 63, and node bus 67 are standard elements for nodes connected to system bus 25. The node specific logic 65, which uses different integrated circuits from system bus interface 64, preferably includes, in addition to the circuitry designed by a user to carry out the specific function of a node, standard circuitry to interface with the node bus 67. In general, data interface 61 is the primary logical and electrical interface between node 60 and system bus 25, clock decoder 63 provides timing signals to node 60 based on centrally generated clock signals, and node bus 67 provides a high speed interface between data interface 61 and node specific logic 65.

In the preferred embodiment of node 60 and system bus interface 64 shown in FIG. 2, clock decoder 63 contains control circuitry for forming signals to be placed on system bus 25 and processes clock signals received from central arbiter 28 to obtain timing signals for node specific logic 65 and data interface 61. Since the timing signals obtained by clock decoder 63 use the centrally generated clock signals, node 60 will operate synchronously with system bus 25.

Figure 3:
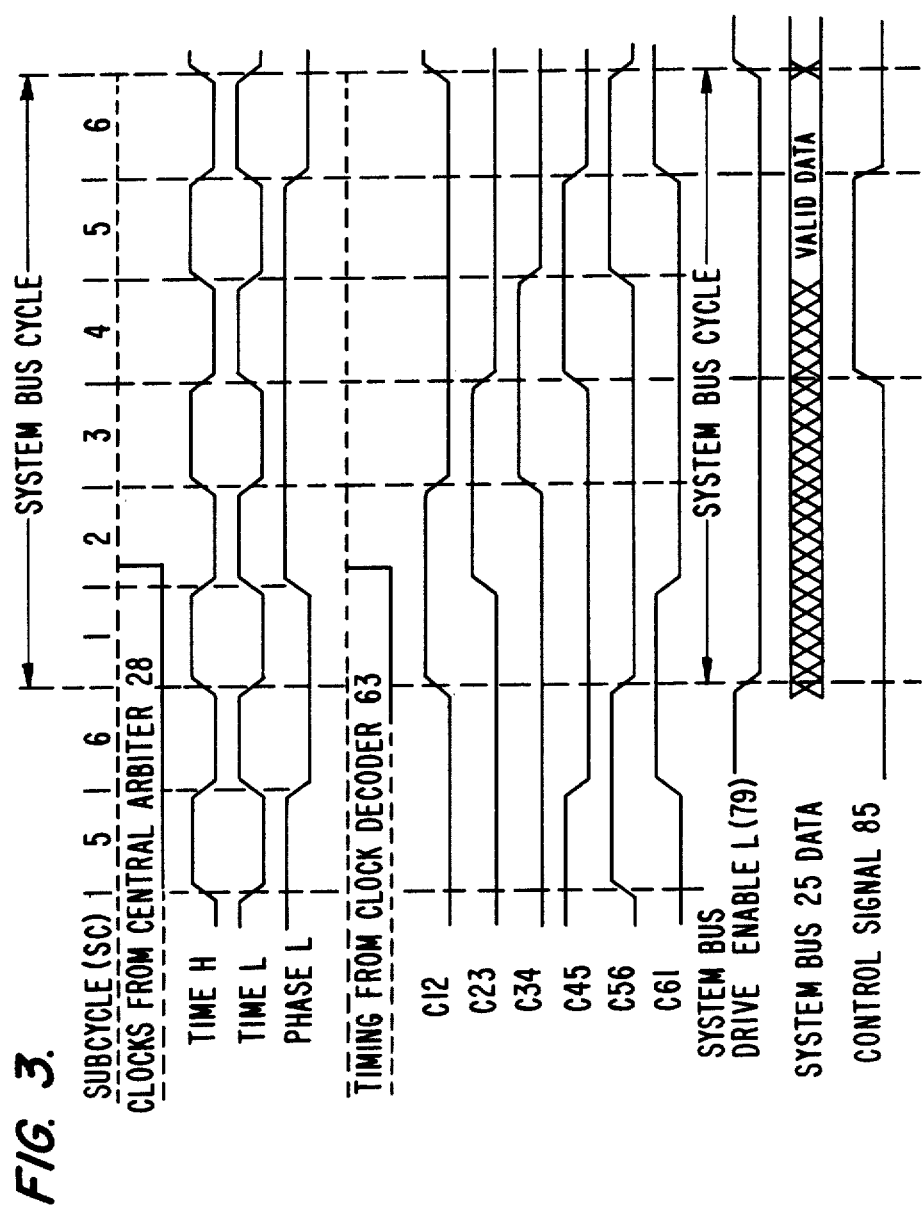
FIG. 3 is a timing diagram showing timing signals used in the data processing system of FIG. 1.

FIG. 3 is a timing diagram showing one bus cycle, the clock signals received by clock decoder 63 from central arbiter 28 (FIG. 1), and certain of the timing signals generated by clock decoder 63. The clock signals received by clock decoder 63 include a Time H signal, a Time L signal, and a Phase signal as shown in FIG. 3. Time H and Time L are inverses of the fundamental clock signals and the Phase signal is obtained by dividing the fundamental clock signal by three. The timing signals generated by clock decoder 63 include C12, C23, C34, C45, C56 and C61, all of which are shown in FIG. 3. Those timing signals required by data interface 61, which occur once per bus cycle, are provided to data interface 61, and a complete set of timing signals, including equivalent ones of the timing signals provided to data interface 61, is buffered and provided to the node specific logic 65. The purpose of buffering is to insure that node specific logic 65 cannot adversely affect the operation of the system bus interface 64 by improperly loading the timing signals. Clock decoder 63 uses the clock signals to create six subcycles for each bus cycle and then uses the subcycles to create the six timing signals CXY, where X and Y represent two adjacent subcycles which are combined to form one timing signal.

Each node in the system bus 25 has its own corresponding set of timing signals generated by its clock decoder 63. While nominally the corresponding signals occur at exactly the same time in every node throughout the system 20, variations between clock decoder 63 and other circuitry in multiple nodes introduce timing variations between corresponding signals. These timing variations are commonly known as "clock skew."

Figure 4:
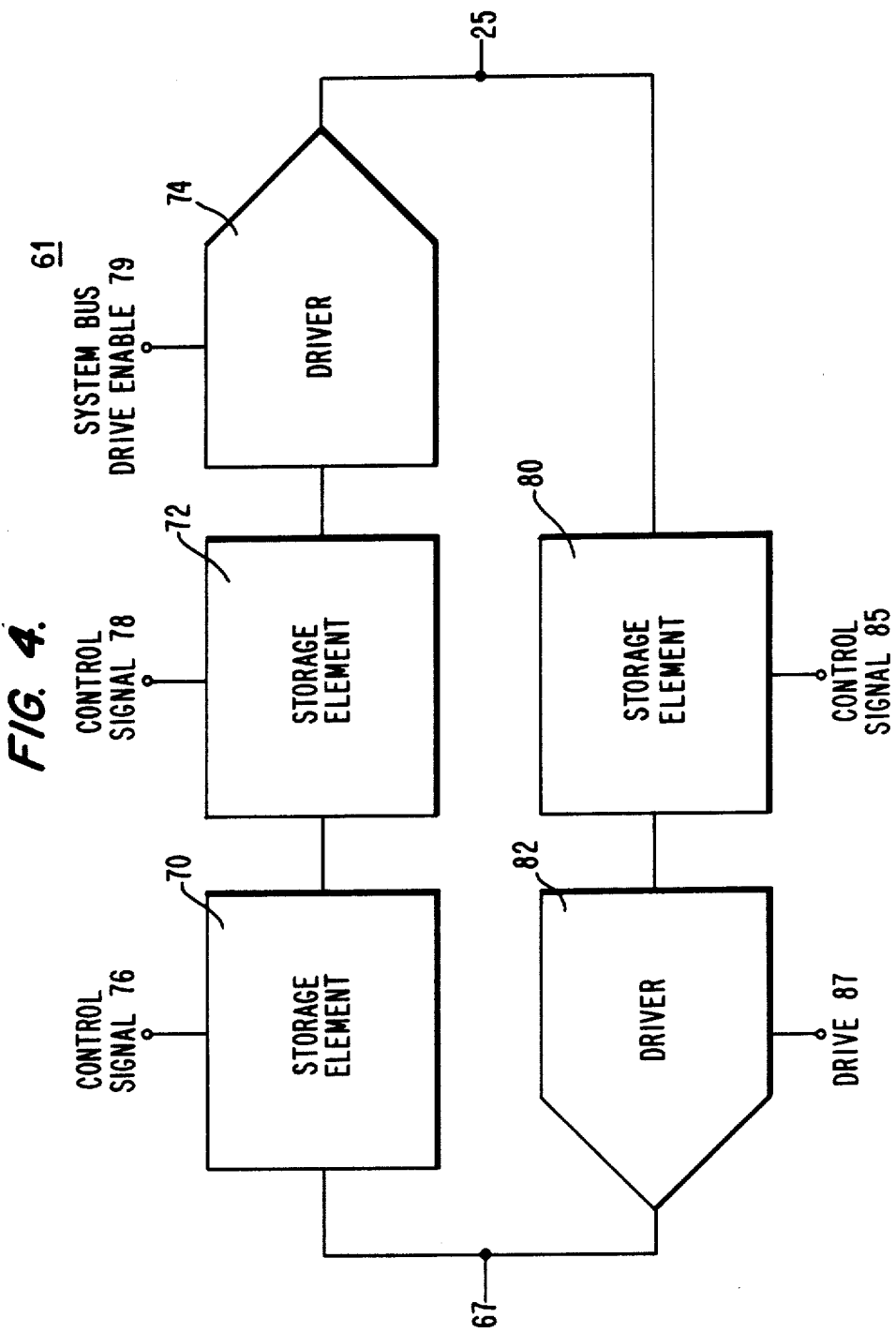
FIG. 4 is a block diagram of the data interface in the node of FIG. 2.

FIG. 4 shows a preferred embodiment of data interface 61. Data interface 61 contains both temporary storage circuitry and bus driver circuitry to provide a bidirectional and high speed interface between each of the lines of node bus 67 and each of the lines of system bus 25. As shown in FIG. 4, data interface 61 preferably includes storage elements 70 and 72 and system bus driver 74 to provide a communication path from node bus 67 to system bus 25. Data interface 61 also includes storage element 80 and node bus driver 82 to provide communication path from system bus 25 to node bus 67. As used in the description of data interface 61, the term "storage element" refers generally to bistable storage devices such as a transparent latch or a master-slave storage element, and not to a specific implementation. Persons of ordinary skill will recognize which types of storage elements are appropriate.

As shown in FIG. 4, storage element 70 has an input connected to receive data from node bus 67 and an output connected to the input of storage element 72. The output of storage element 72 is connected to an input of system bus driver 74 whose output is connected to system bus 25. Storage elements 70 and 72 are controlled by node bus control signals 76 and 78, respectively, which are derived from the timing signals generated by clock decoder 63. Storage elements 70 and 72 provide a two-stage temporary storage for pipelining data from node bus 67 to system bus 25. Different numbers of storage stages can also be used.

System bus driver 74 is controlled by system bus drive enable 79. According to the state of the system bus drive enable 79, the input of system bus driver 74 either is coupled to its output, thereby transferring the data at the output of storage element 72 to system bus 25, or decoupled from that output. When system bus drive enable 79 decouples the input and output of the system bus driver 74, system bus driver 74 presents a high impedance to system bus 25. The system bus drive enable 79 is also generated by clock decoder 63 in accordance with clock signals received from system bus 25 and control signals received from the node specific logic 65.

Storage element 80 has an input terminal connected to system bus 25 and an output terminal connected to an input of node bus driver 82. The output of node bus driver 82 is connected back to node bus 67. Storage element 80, preferably a transparent latch, is controlled by a system bus control signal 85 which is derived from the timing signals generated by clock decoder 63. A node bus drive signal 87 controls node bus driver 82 similar to the manner in which system bus drive signal 79 controls system bus driver 74. Thus, in response to node bus drive signal 87, node bus driver 82 either couples its input to its output or decouples its input from its output and provides a high impedance to node bus 67.

In order to explain how data is transferred over system bus 25, it is important to understand the relationship between system bus drive enable 79 and control signal 85. In the present embodiment, this relationship is shown in FIG. 3. System bus drive enable 79 is nominally driven from the beginning to the end of a bus cycle. The new data become available for receipt from system bus 25 at some time later in the bus cycle after driver propagation and bus settling time has occurred. In the present embodiment, storage element 80 is a transparent latch. Control signal 85 is logically equivalent to clock C45. The bus timing assures that system bus 25 data is available for receipt sometime prior to the deassertion of control signal 85. Storage element 80 stores bus data that is stable at least a set-up time prior to the deassertion of control signal 85 and remains stable a hold time after the deassertion of control signal 85.

Node bus 67 is preferably a very high speed data bus which allows bidirectional data transfer between the node specific logic 65 and system bus 25 by way of data interface 61. In the preferred embodiment of node 60 shown in FIG. 2, node bus 67 is an interconnect system consisting of point-to-point connections between the system bus interface 64 and the node specific logic 65. In accordance with the present invention, however, there is no requirement for such point-to-point interconnection.

Figure 5:
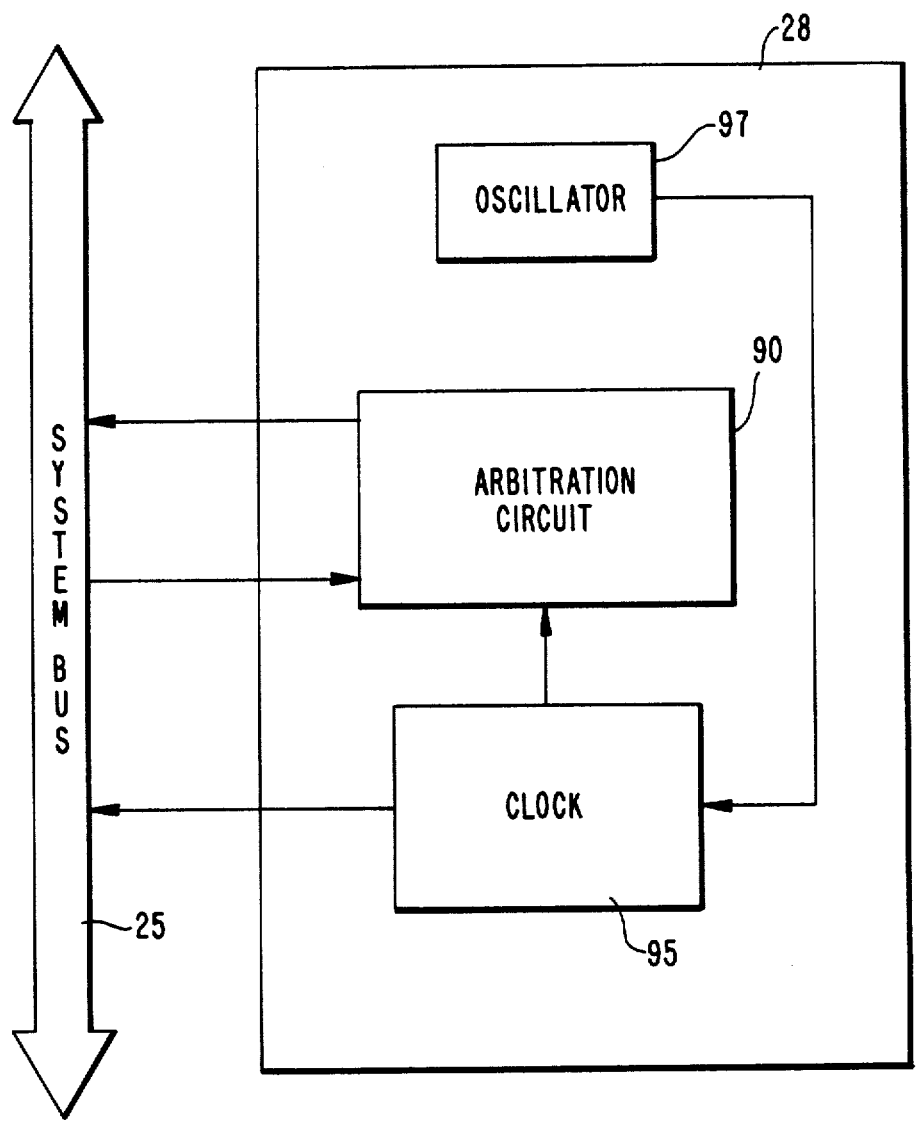
FIG. 5 is a block diagram of the arbiter in the data processing system of FIG. 1.

FIG. 5 shows a preferred embodiment of the central arbiter 28 which is also connected to system bus 25. Central arbiter 28 provides the clock signals for system bus 25 and grants ownership of the bus to the nodes on system bus 25. Central arbiter 28 preferably includes an arbitration circuit 90, a clock circuit 95, and a oscillator 97. Oscillator 97 generates the fundamental clock signals. Clock 95 provides timing signals for arbitration circuit 90 and the basic Time H, Time L, and Phase clock signals for timing on system bus 25. Arbitration circuit 90 receives the commander and responder request signals, arbitrates conflicts between nodes desiring access to system bus 25, and maintains the queues referred to above for the commander and responder requests. Arbitration circuit 90 also provides certain control signals to clock 95.

B. Arbitration

In accordance with the invention, each of the nodes on a bus can obtain access to that bus in order to transfer messages to other nodes. The messages may take one or more bus cycles. At a given time, any or all of the nodes 60 may desire to perform transfers on the bus 25. In the present invention, the bus cycles used for arbitration can occur in parallel with the bus cycles for transfer of data.

The nodes in the present invention include bus request means for generating a bus request at times when a message is to be transferred from the node onto the bus. As embodied in FIG. 6, a CPU node 31 and an I/O device node 51 are both included in system 20, which also includes a plurality of other nodes (not shown). In on embodiment, CPU node 31 includes a command generator 110 within its node specific logic 65, and I/O device node 51 includes response generator 112 within its node specific logic (not shown).

At times when either node 31 or node 51 is ready to perform a transfer, they must output a bus request to arbiter 28 on their respective bus request lines. For example, at times when CPU node 31 needs to write data into another node in the system 20, command generator 110 will generate a (commander) bus request in order to request access to bus 25 for at least two consecutive bus cycles. As another example, when I/O device node 51 has previously generated an interrupt request and must transfer interrupt vector data to another node in response to the transfer of an interrupt acknowledge command by that other node, response generator 112 will generate a (responder) bus request. In the case of an interrupt vector message, I/O node 51 typically demands access to bus 25 for only a single bus cycle.

In the preferred embodiment, bus requests are sent from each of the nodes in the system 20 to arbiter 28 using a pair of dedicated lines. A commander request line, such as CMD REQ 102 or 106, is used by a node to request access when the node is initiating new transactions, and a responder request line, such as RES REQ 104 or 108 is used by a node to return data to a commander, such as when a read command or an interrupt acknowledge command is received and serviced by a node. Preferably, a responder request has higher priority than a commander request.

Figure 6:
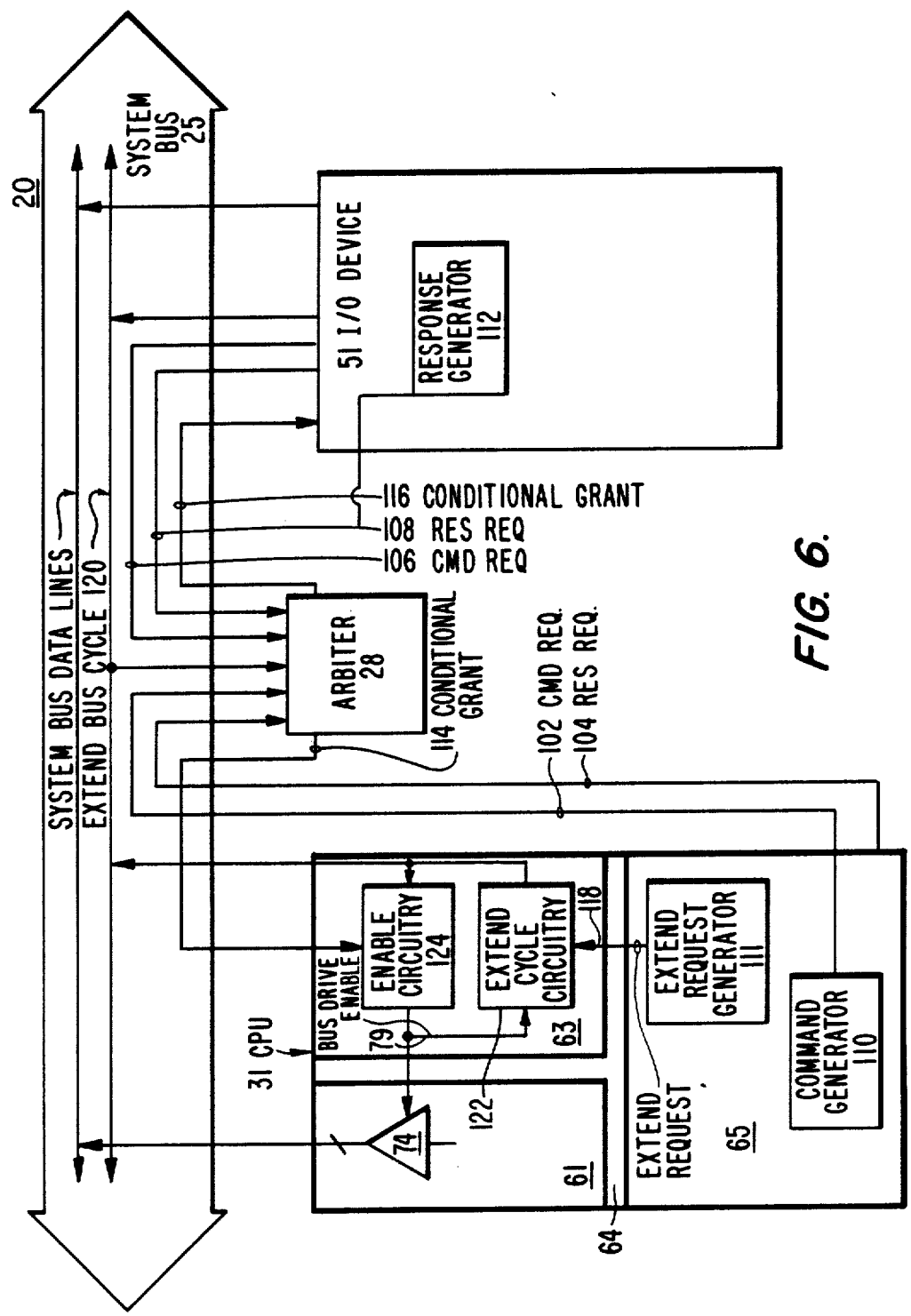
FIG. 6 is a block diagram of portions of the data processing system in FIG. 1 showing the arbitration signals.
Figure 10:
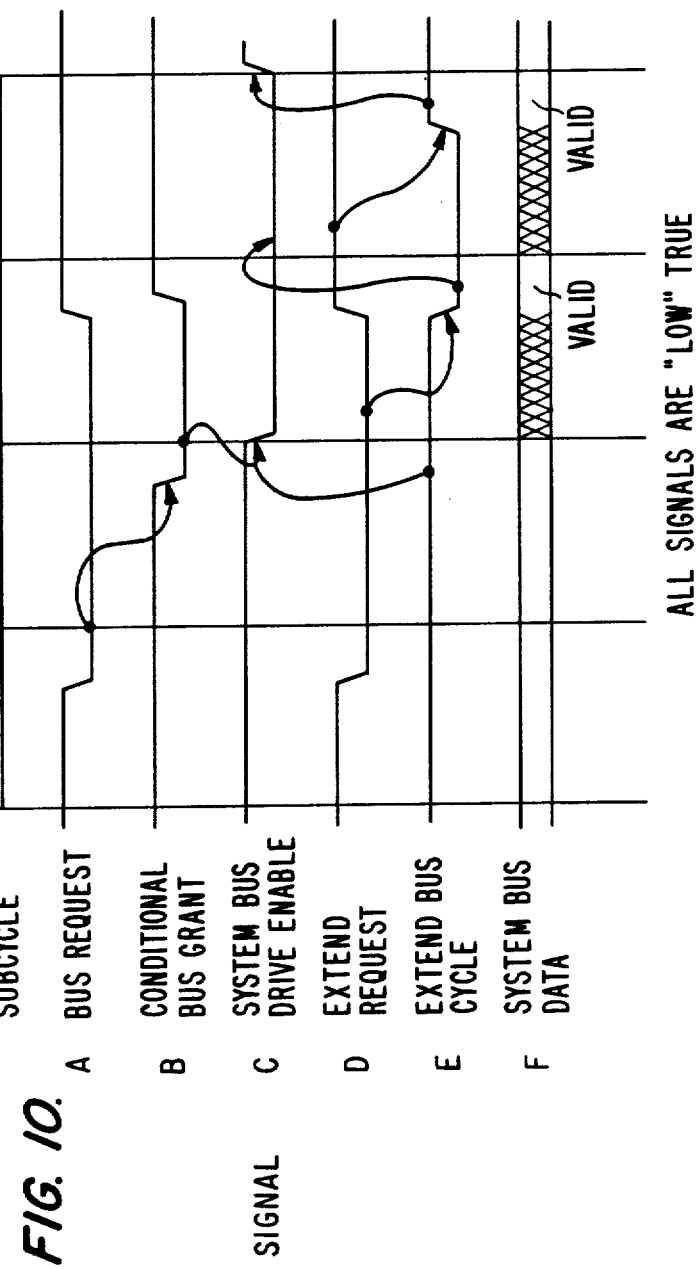
FIG. 10 is a timing diagram showing bus request, conditional bus grant, system bus drive enable, extend request, and extend bus cycle signals activated during operation of the data processing system of FIG. 1.

As shown in FIG. 6 for the example discussed above, CPU 31 will generate a bus request on its dedicated commander request line 102, and I/O device 51 will generate a bus request on its dedicated responder request line 108. As discussed previously, each bus cycle in the preferred embodiment is divided into six subcycles. In the present embodiment, the arbiter 28 samples bus requests from each of the nodes during subcycles 6 and 1 of each bus cycle, as shown in FIG. 10. In FIG. 10, the origin of the arrow indicates the approximate sample time of a signal, and the presence of an activated signal is determined by the voltage level at the origin of the arrow.

Returning to FIG. 6, in accordance with the present invention, extend request means are provided for generating an extend request for each of the nodes which require more than one bus cycle to transfer a message, and for maintaining this extend request during succeeding bus cycles. As embodied herein, if CPU 31 creates a write command in command generator 110, that command will require multiple bus cycles to complete the transfer of data. Command data is transferred during an initial access cycle, and write data is transferred during succeeding cycles. The initial access cycle is the first cycle in which system bus drive enable signal 79 is asserted for a transfer. Therefore, an extend request generator 111 will output an extend request on line 118 at the same time that command generator 110 is asserting commander request line 102, and will maintain this extend request on line 118 until the last bus cycle, during which transfer of data is completed.

In accordance with the invention, each of the nodes includes extend cycle means coupled to the extend request means for activating an extend bus cycle signal during the initial access cycle when the node becomes a transmitter, and for maintaining the extend bus cycle signal activated during succeeding bus cycles, at times when the extend request for the node is present. As embodied herein, the extend bus cycle signal (FIG. 10, signal E) is output on extend bus cycle line 120, which is coupled to the arbiter 28 and to each of the nodes in system 20. Preferably, CPU 31 includes extend cycle circuitry 122 in clock decoder 63 for activating the extend bus cycle signal (FIG. 10, signal E) on line 120 (FIG. 6) during the initial access bus cycle and succeeding bus cycles at times when the extend request on line 118 is present.

A node cannot activate the extend bus cycle signal if an extend bus cycle signal is currently activated by another node, or a conditional bus grant (FIG. 10, signal B) has not been received. As shown in FIG. 6, extend cycle circuitry 122 in CPU 31 receives an extend request generated by extend request generator 111. Circuitry 122 then activates the extend bus cycle signal on extend bus cycle line 120 if the two conditions just described do not exist.

Each node in accordance with the invention includes receiving means for receiving a conditional bus grant from the arbiter and for receiving an extend bus cycle signal from the other nodes. When it is in an activated state, the extend bus cycle signal indicates that a node which is currently transmitting a message will continue to transfer the message during the next bus cycle. Each of the nodes includes enable circuitry 124 that is coupled to a common extend bus cycle line 120 in order to receive an extend bus cycle signal activated by any one of the nodes. Additionally, enable circuitry 124 for each node, which in the present embodiment is included in clock decoder 63, is coupled to arbiter 28 by a dedicated point-to-point conditional bus grant line corresponding to that node, such as lines 114 and 116. Arbiter 28 transmits a conditional bus grant to a selected node along one of these dedicated lines. For example, conditional grant line 114 and 116 respectively couple CPU 31 and I/O device 51 to arbiter 28.

During any given bus cycle, arbiter 28 receives bus requests (FIG. 10, signal A) from a number of nodes 60 and determines which selected node 60 will be "conditionally" granted access to the bus 25. In the present embodiment shown in FIG. 10, after arbiter 28 samples the bus request (signal A) subcycle 6 (in bus cycle 1) and subcycle 1 (in bus cycle 2), it transmits a conditional bus grant (signal B) to a selected node. The conditional bus grant (signal B) is sampled by the selected node during subcycle 6 of the second bus cycle. If no extend bus cycle signal (signal E) is activated on extend bus cycle line 120 (FIG. 6) when sampled by the selected node during the second bus cycle, the node will become a transmitter and transfers its message to system bus 25 beginning with the third bus cycle. In this example, the node selected during the second cycle bacame a transmitter during the third cycle, and the third bus cycle is therefore the "initial access cycle" for that transmitter. If an extend bus cycle signal is activated on line 120 and sampled by enable circuitry 124 of the selected node during subcycles 4 and 5 of the second bus cycle, then the selected node is unable to obtain access to bus 25 during the next bus cycle, despite receiving a conditional bus grant during subcycle 6 of the second cycle.

Referring again to FIG. 6, in accordance with the invention, each of the nodes includes bus access means, coupled to the extend bus cycle means and responsive to the conditional bus grant, for generating a system bus drive enable signal in the selected node when no extend bus cycle signal is activated by another node which was the previous transmitter; and for maintaining the system bus drive enable signal level while the extend bus cycle signal for the selected transmitter node is activated. As embodied herein, enable circuitry 124 activates system bus drive enable signal 79 for driver 74, which is shown in FIG. 4 as contained in data interface circuitry 61. At times when driver 74 is enabled by an activated system bus drive enable signal 79, a message can be transferred onto system bus 25 from the node.

Figure 7:
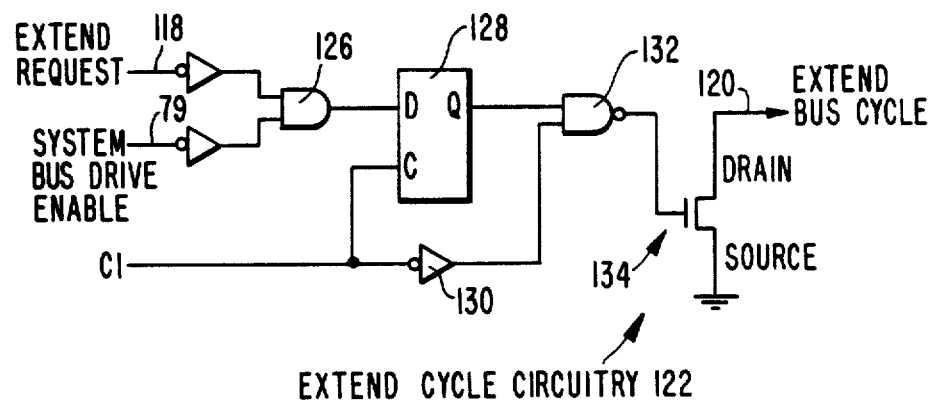
FIG. 7 is a schematic diagram of extend cycle circuitry in the system portions in FIG. 6.

The preferred embodiment of a means for activating an extend bus cycle signal is shown in FIG. 7. For purposes of illustration, it will be assumed that, except for timing signals and as otherwise stated, all signals are at a low level when activated. System bus drive enable signal 79 and extend request signal 118 are both coupled to AND gate 126. The output of AND gate 126 is coupled to storage element 128, which is preferably a D- type flip-flop, but as is the case generally throughout this description, equivalent logic circuit elements can be used instead. Therefore, storage element 128 can only be set at times when the extend request (FIG. 10, signal D) generated by the node is present and when the node has obtained access to bus 25 for the current bus cycle.

In FIG. 7, storage element 128 is set or reset during subcycle 1 of each bus cycle, using clock signal C1. The output of storage element 128 enables a NAND gate 132. Clock signal C1 is also used as an input to inverter 130 in order to enable NAND gate 132 during subcycles 2 through 6, which is coupled to the output of inverter 130. The open drain line driver 134 is turned on by an active output of NAND gate 132 when the extend bus cycle line 120 is to be driven low.

Figure 8:
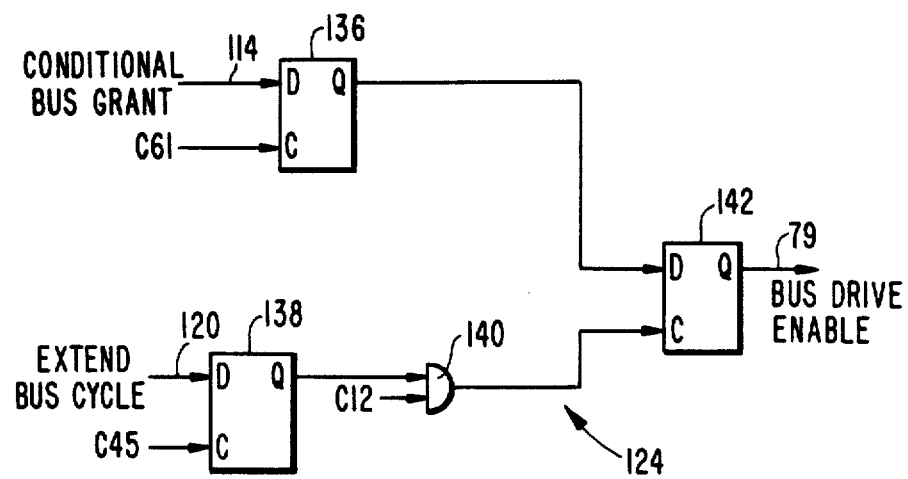
FIG. 8 is a schematic diagram of enable circuitry in the system portions in FIG. 6.

The preferred embodiment for enable circuitry 124 contained in clock decoder 63 is shown in FIG. 8. In response to the receipt of a conditional bus grant on line 114, a storage element 136, such as a D-type flip-flop, will be set. Storage element 136 is set or reset using clock signal C61 beginning on the sixth subcycle of each bus cycle. If an extend bus cycle signal on extend bus cycle line 120 is activated, storage element 138 will be set using clock signal C45 beginning on the fourth subcycle of each bus cycle. The output of storage element 138 is used to enable AND gate 140. AND gate 140 is also enabled by clock signal C12 beginning on the first subcycle of each bus cycle. The output of AND gate 140 is used to clock data into storage element 142, the data input of which is coupled to the conditional bus grant line 114 through storage element 136. The output of storage element 142 is the system bus drive enable signal 79 which is coupled to extend bus cycle circuitry 122 and to driver 74. If the data input to storage element 142 is activated while the output of AND gate 140 is activated, then the system bus drive enable signal 79 is activted.

System system bus drive enable signal 79, because of the manner in which it is activated, allows CPU 31 to obtain access to bus 25 during the initial bus access cycle when conditional bus grant line 114 is asserted and extend bus cycle signal 120 is not activated. For example, as shown in FIGS. 6, 8, and 10, if CPU 31 generated a bus request (FIG. 10, signal A) during a first bus cycle, it will be latched into arbiter 28 from line 102 beginning on subcycle 6 of the first bus cycle. If CPU 31 has issued the highest priority request, arbiter 28 will transmit a conditional bus grant (signal B) to CPU 31 during the second bus cycle, and CPU 31 will clock storage element 136 beginning on subcycle 6 of the second bus cycle in order to receive the conditional bus grant on line 114. If no extend bus cycle signal on line 120 is activated when it is sampled during the fourth and fifth subcycles of the second bus cycle, then storage element 142 will be able to activate system bus drive enable signal 79 during the third bus cycle. Therefore, CPU 31 obtains access to bus 25 at the beginning of the third bus cycle.

However, no system bus drive enable signal level (signal C) would have been activated by storage element 142 if an extend bus cycle signal (signal E) had been activated by another node 60, for example node 51, during the second bus cycle. If an extend bus cycle signal on line 120 were activated during the second bus cycle, then AND gate 140 would have been disabled by storage element 138. Therefore, the activation of an extend bus cycle signal (signal E) suppresses the coupling of a conditional grant on line 114 into storage element 142. CPU 31 is unable to obtain access to bus 25 during the third bus cycle, despite the presence of a conditional grant on line 114 during the second bus cycle.

Enable circuitry 124 allows CPU 31 to maintain the bus drive enable signal (signal C) level for the needed bus cycles succeeding the initial access cycle even though CPU 31 is no longer selected by arbiter 28 and is not receiving the conditional grant on line 114. As shown in FIG. 6, an extend request is asserted on line 118 by extend request generator 111 when CPU 31 demands access to bus 25 during more than one bus cycle in order to perform a multi-cycle transfer. If bus system drive enable signal 79 (signal C) is asserted by CPU 31 during the third bus cycle, as also shown in FIG. 10, the presence of an extend request (signal D) causes extend cycle circuitry 122 to drive extend bus cycle line 120 during the initial access (third) bus cycle. Therefore, as shown additionally in FIG. 8, when extend bus cycle line 120 is sampled during subcycles 4 and 5 of the third bus cycle, AND gate 140 will be disabled. As a result, although storage element 142 is coupled to conditional grant signal 114, the contents of storage element 142 cannot be updated because of the activation of the extend bus cycle signal (signal E). Therefore, CPU 31 will not change the contents of storage element 142 at the beginning of the fourth bus cycle. This causes storage element 142 to maintain the system bus drive enable signal level (signal C) during the succeeding bus cycle, and node 31 will be able to perform a multi-cycle write transfer during bus cycles 3 and 4. Node 31 will not relinquish control of bus 25 until after until after extend request generator 111 stops generating the extend request during the fourth bus cycle, as shown in FIG. 10.

Figure 9:
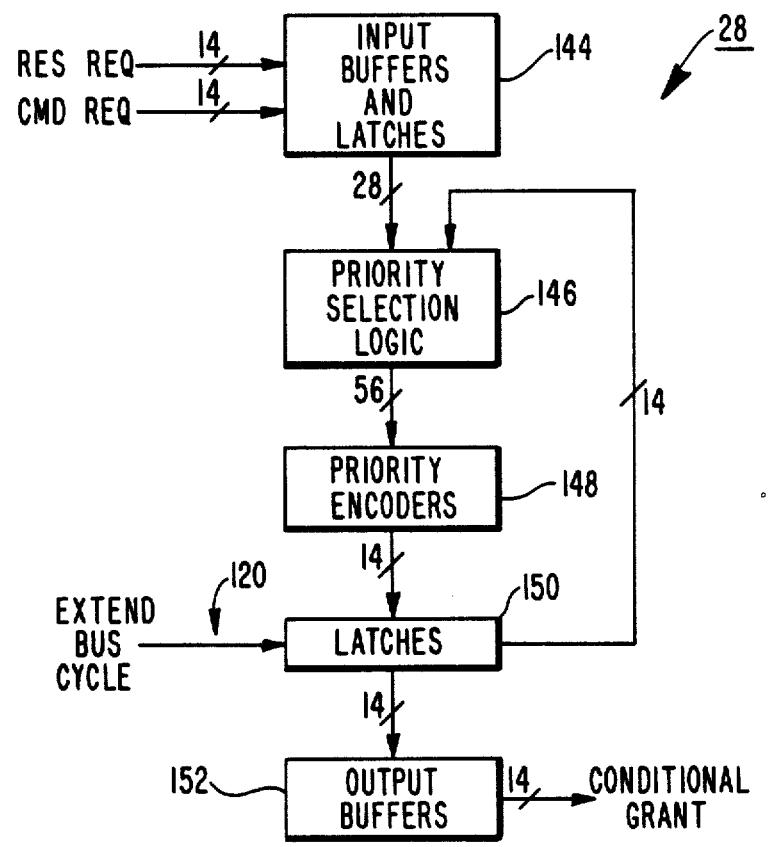
FIG. 9 is a block diagram of the central arbiter shown in FIGS. 5 and 6.

An arbiter means is coupled to the bus request means of each node for transmitting a conditional bus grant to a selected one of the nodes in response to the bus requests. A block diagram of the portions of arbiter 28 performing such functions is shown in FIG. 9. As shown in FIGS. 6 and 9, bus requests from nodes such as CPU 31 and I/O device 51 are sent on separate commander request lines, such as lines 102 and 106, and separate responder request lines, such as lines 104 and 108. In one preferred embodiment, up to 14 separate nodes 60 are included in system 20.

Arbiter 28, as shown in FIG. 9, includes input buffers and latches 144 for receiving fourteen (14) commander request signals and fourteen responder request signals. Beginning on subcycle 6 of a bus cycle, as shown in FIG. 10, arbiter 28 samples the twenty-eight (28) bus request signals (FIG. 10, signal A) and stores the bus requests in latches 144. The stored data is output from latches 144 to priority selection logic 146 using twenty-eight separate lines, one corresponding to each commander or responder request line. Priority selection logic 146 has fifty-six (56) output lines to the priority encoders 148, two lines corresponding to each request line. From the priority encoders 148, only fourteen lines, one corresponding to each node 60, are output to latches 150. The latches 150 also receive as an input the extend bus cycle line 120. Latches 150 have fourteen output lines, one corresponding to each node 60, that are fed back to priority selection logic 146 and are also sent to output buffers 152. The output buffers 152 are coupled to the fourteen conditional bus grant lines, such as lines 114 and 116, coupled to the nodes 60.

The arbiter means may include means for executing a round-robin algorithm for determining the selected one of the plurality of nodes. Arbiter means may also include means for determining as the selected node a node generating a responder request prior to selecting a node generating a commander request. In the arbiter 28 shown in FIG. 9, during any given bus cycle, the lines from input buffers and latches 144 will contain signal levels corresponding to commander and responder request lines, such as lines 102, 104, 106, and 108, on which a bus request was present during the preceding bus cycle.

The elements shown in FIG. 9 perform the arbitration functions. Priority selection logic 146 and priority encoder 148 act as an arbitration queue, and selection logic 146 selects, for the fourteen incoming commander requests and the fourteen incoming responder requests, one of two output lines for each enabled request line in order to execute a round-robin algorithm.

In the preferred embodiment, twenty-eight locations for responder requests form a first queue and twenty-eight locations for commander requests form a second queue. Responder bus requests, which are included in the first queue, will be given higher priority than commander bus requests. Although only fourteen commander and fourteen responder bus request signals are input to the arbiter 28, there are twenty-eight locations in each of the two queues for each set of fourteen requests, so that each request can be assigned to one of two priorities. A high priority array of fourteen locations for each queue is executed first, and a low priority array of fourteen locations is executed last for each queue. As embodied herein, from startup or a period of inactivity, all bus requests are assigned to the high rather than the low priority array of priority selection logic 146 output lines.

During active periods, priority selection logic 146 determines in which of the two priorities to place each incoming request within its respective (responder or commander) queue based on fourteen lines fed back to logic 146 from latches 150. An activated signal will be present on only one of the fourteen lines fed back from latches 150, and this line will correspond to the node 60 that received the conditional bus grant during the preceding bus cycle. In one preferred implementation, the node with ID number having a higher ID, or node number, is given higher priority. Thus, node 14 will be selected first to receive a conditional bus grant, followed by the nodes with ID numbers 13, 12, etc.

A round robin algorithm can be implemented because the feedback from latches 150 allows priority selection logic 146 to place into the low priority array all bus requests from nodes having IDs greater than or equal to that of the node to which the condition bus grant (FIG. 10, signal B) was previously transmitted. After all nodes with active requests have been granted the bus 25, the high priority array is empty of all entries and all requests will be placed back in the high priority array. This algorithm ensures that all nodes in a given queue, i.e., responder or commander, shall obtain access to the bus 25 before any other nodes in the same queue obtain access for a second time.

The levels of the input signals on the fifty-six lines received by priority encoders 148 determine which node 60 will be selected to receive the next conditional grant. In one example, priority selection logic 146 places a responder request from the node with ID number 2 in the high priority array, a responder request from the node with ID number 14 in the low priority array, a commander request from the node with ID number 3 in the high priority array, and a commander request from the node with ID number 13 in the low priority array. During the current bus cycle, priority encoders 148 will select only one of fourteen output lines, which line corresponds to the node to which a conditional grant is transmitted during the current bus cycle. In this example, the responder request from the node with ID number 2 will be given the highest priority, and therefore, only the input line to latches 150 corresponding to the node with ID number 2 will be enabled. The latch 150 corresponding to the node with ID number 2 will be set, and will drive the corresponding output buffer 152 in order to transmit a conditional bus grant (FIG. 10, signal B) to a selected node with ID number 2. The feedback of fourteen lines from latches 150 to priority selection logic 146 will be updated to reflect that the node with ID number 2 was the last node 60 to receive a conditional grant, and therefore priority selection logic 146 will place any bus request from the node with ID number 2 into the low priority array during the next bus cycle. Thus, a responder request from any node 60 other than the nodes with ID numbers 2 or 14 will have the highest priority during the next bus cycle. If more than one responder with a node ID other than 2 or 14 make a request for the next cycle, then the responder with the highest node ID will have the highest priority during the next cycle. The commander requests become the highest priority only when no responder requests are present.

The arbiter 28 also may include means responsive to the activation of an extend bus cycle signal for ensuring that, while the extend bus cycle signal is activated, the selected node remains the same as the node to which the conditional bus grant was transmitted during the previous bus cycle. As shown in FIG. 9, extend bus cycle line 120 is coupled to latches 150. At times when the extend bus cycle signal is activated during a bus cycle, the output from priority encoders 148 cannot be loaded into latches 150. Therefore, the contents of latches 150 will remain the same, causing the conditional bus grant (FIG. 10, signal B) to be transmitted to the same selected node 60 in consecutive bus cycles. Similarly, the feedback to priority selection logic 146 will remain the same. This prevents a node from being assigned to the lower priority array that was unable to obtain access to bus 25 because another node was executing a multi-cycle transfer.

In the preferred embodiment of the invention, the extend bus cycle line 120 includes a wired-OR connection to each of the plurality of nodes 60. Thus, whenever one node activates an extend bus cycle signal, each of the other nodes receives it and is prevented from obtaining access to the bus 25 even if the node has received a conditional grant. The extend bus cycle line 120 is an open drain line and is terminated on the backplane of the system 20 with a pair of resistive dividers, each consisting of 126 ohms to a +5 volts supply and 500 ohms to ground. This provides a Thevenin equivalent termination of approximately 50 ohms tied to +4 volts. The extend bus cycle lines 120 are also series terminated at the driver 134 (FIG. 7) with a resistance of about 20 ohms, which reduces peak output current, and thus noise on the power and ground lines, and provides impedance matching between driver 134 (with an output resistance as low as 2 ohms) and the backplane (impedance typically 20-50 ohms depending on loading).

In the preferred embodiment of the invention, there are several rules on the use of the extend bus cycle signal (FIG. 10, signal E). The extend bus cycle signal is used only to implement multi-cycle transfers; it is not available to commanders to initiate multiple transactions. The only node 60 that may activate the extend bus cycle signal is a node that currently has access to the bus 25. By activating its extend bus cycle line, a node 60 that is currently the transmitter on to bus 25 guarantees that it will be the transmitter on the bus 25 in the next bus cycle, independent of the priority of its bus request signal (signal A). Finally, it is preferable that no node 60 be allowed to activate an extend bus cycle signal for more than four consecutive bus cycles.

The result of the present invention is a reduction in arbitration and system bus cycle time without requiring additional backplane pins. In the arbitration method of this invention, the central arbiter 28 selects a particular node and issues a conditional grant. That grant can be issued more quickly because it is transmitted before a final determination is made whether access to the bus 25 will actually transfer to another node during the next bus cycle. Each of the nodes 60 contains logic that examines an extend bus cycle signal to determine whether the conditional grant from the central arbiter 28 causes that node to become a transmitter. Once a node becomes a transmitter, its logic allows it to activate the extend bus cycle signal in order to maintain access to the bus 25 at times when that node is executing a multi-cycle transfer. This invention thus guarantees that no other node will gain access to the bus 25 until the current transmitter has completed its multi-cycle transfer.

It will be apparent to those skilled in the art that various modifications and variations can be made in the arbitration scheme of the present invention without departing from the scope or spirit of the invention. Thus, it is intended that the present invention could cover the modifications and variations of this invention provided they come within the scope of the appended claims and their equivalents.

What is claimed is:

1. A responder node coupled to a commander request line, a responder request line, and a grant line corresponding exclusively to the responder node, and coupled to each of a plurality of other nodes by a pended bus, wherein a node becomes a transmitter in order to transfer a message, including a command or including return data, on the pended bus during one or more cycles of the bus, wherein a commander node initiates a transaction on the pended bus by making a command transfer, wherein a responder node completes the transaction on the pended bus by making a return data transfer in response to the command transfer, and wherein a node can access the pended bus after the commander node initiates a transaction and before the responder node completes the transaction, the responder node comprising:

responder bus request means, coupled to the responder request line, for generating a responder bus request and transmitting the responder bus request on the responder request line at times when return data is to be transferred from the responder node onto the bus;

extend request means for generating an extend request for the responder node at times when the responder node requires more than one bus cycle to transfer a message;

extend cycle means, coupled to the extend request means, for activating an extend bus cycle signal when the responder node becomes a transmitter at times when the extend request for the responder node is present; and bus access means, coupled to the grant line, for obtaining control of the pended bus to enable the responder node to become a transmitter during an initial access cycle, in response to receipt of a conditional bus grant on the grant line, at times when an extend bus cycle signal is not activated by any of the other nodes, and for maintaining control of the pended bus to enable the responder node to remain the transmitter during bus cycles succeeding the initial access cycle at times when the extend bus cycle signal is activated by the responder node.

2. A node according to claim 1 wherein the extend request means includes means for generating the extend request during the initial access cycle.

3. A node in accordance with claim 1 wherein the extend request means includes means for maintaining the extend request until the node is the transmitter for a sufficient number of bus cycles to transfer the entire message.

4. A responder node in accordance with claim 1, in which the bus access means includes means for asserting a system bus drive enable signal in the responder node to enable the responder node to obtain control of the pended bus during an initial access cycle, in response to receipt of a conditional bus grant on the grant line, at times when an extend bus cycle signal is not activated by any of the other nodes, and for asserting the system bus drive enable signal to enable the responder node to maintain control of the pended bus during bus cycles succeeding the initial access cycle at times when the extend bus cycle signal is activated by the responder node.

5. A node in accordance with claim 4 in which the bus access means includes:

a first circuit for asserting the system bus drive enable signal during the initial access cycle; and a second circuit for extending the system bus drive enable signal while the extend bus cycle signal is activated.

6. A node in accordance with claim 3 wherein the node completes the transfer of the message during a last one of the bus cycles, and wherein the means for maintaining the extend request includes means for maintaining the extend request until the bus cycle preceding the last bus cycle.

7. A responder node coupled to a central arbiter by a commander request line, a responder request line, and a grant line corresponding exclusively to the responder node, and coupled to each of a plurality of other nodes by a shared extend bus cycle line and by a pended bus, wherein a node becomes a transmitter in order to transfer a message, including a command or including return data, on the pended bus during one or more cycles of the bus, wherein a commander node initiates a transaction on the pended bus by making a command transfer, wherein a responder node completes the transaction on the pended bus by making a return data transfer in response to the command transfer, and wherein a node can access the pended bus after the commander node initiates a transaction and before the responder node completes the transaction, the responder node comprising:
responder bus request means, coupled to the responder request line, for generating a responder bus request and synchronously transmitting the responder bus request on the responder request line at times when return data is to be transferred from the responder node onto the bus;
extend request means for generating an extend request for the responder node at times when the responder node requires more than one bus cycle to transfer a message;
extend cycle means, coupled to the extend request means and to the extend bus cycle line, for activating an extend bus cycle signal on the extend bus cycle line when the responder node becomes a transmitter at times when the extend request for the responder node is present; and
bus access means, coupled to the grant line and to the extend bus cycle line, for obtaining control of the pended bus to enable the responder node to become a transmitter during an initial access cycle, in response to receipt of a conditional bus grant on the grant line, at times when an extend bus cycle signal is not activated on the extend bus cycle line by any of the other nodes, and for maintaining control of the pended bus to enable the responder node to remain the transmitter during bus cycles succeeding the initial access cycle at times when the extend bus cycle signal is activated by the responder node.

8. A responder node in accordance with claim 7, in which the bus access means includes means for asserting a system bus drive enable signal in the responder node to enable the responder node to obtain control of the pended bus during an initial access cycle, in response to receipt of a conditional bus grant on the grant line, at times when an extend bus cycle signal is not activated on the extend bus cycle line by any of the other nodes, and for asserting the system bus drive enable signal to enable the responder node to maintain control of the pended bus during bus cycles succeeding the initial access cycle at times when the extend bus cycle signal is activated by the responder node.

9. A responder node coupled to a central arbiter by a commander request line, a responder request line, and a grant line corresponding exclusively to the responder node, wherein the central arbiter provides a conditional bus grant to a node generating a responder bus request prior to providing a conditional bus grant to a node generating a commander bus request, the node coupled to each of a plurality of other nodes by a shared extend bus cycle line and by a pended bus, wherein a node becomes a transmitter in order to transfer a message, including a command or including return data, on the pended bus during one or more cycles of the bus, wherein a commander node initiates a transaction on the pended bus by making a command transfer, wherein a responder node completes the transaction on the pended bus by making a return data transfer in response to the command transfer, and wherein a node can access the pended bus after the commander node initiates a transaction and before the responder node completes the transaction, the responder node comprising:
responder bus request means, coupled to the responder request line, for generating a responder bus request and synchronously transmitting the responder bus request on the responder request line at times when return data is to be transferred from the responder node onto the bus;
extend request means for generating an extend request for the responder node at times when the responder node requires more than one bus cycle to transfer a message;
extend cycle means, coupled to the extend request means and to the extend bus cycle line, for activating an extend bus cycle signal on the extend bus cycle line when the responder node becomes a transmitter at times when the extend request for the responder node is present; and
bus access means, coupled to the grant line and to the extend bus cycle line, for obtaining control of the pended bus to enable the responder node to become a transmitter during an initial access cycle, in response to receipt of a conditional bus grant on the grant line, at times when an extend bus cycle signal is not activated on the extend bus cycle line by any of the other nodes, and for maintaining control of the pended bus to enable the responder node to remain the transmitter during bus cycles succeeding the initial access cycle at times when the extend bus cycle signal is activated by the responder node.

10. A node in accordance with claim 9 wherein the extend request means includes means for maintaining the extend request until the node is the transmitter for a sufficient number of bus cycles to transfer the entire message.

11. A node according to claim 9 wherein the extend request means includes means for generating the extend request during the initial access cycle.

12. A responder node in accordance with claim 9, in which the bus access means includes means for asserting a system bus drive enable signal in the responder node to enable the responder node to obtain control of the pended bus during an initial access cycle, in response to receipt of a conditional bus grant on the grant line, at times when an extend bus cycle signal is not activated on the extend bus cycle line by any of the other nodes, and for asserting the system bus drive enable signal to enable the responder node to maintain control of the pended bus during bus cycles succeeding the initial access cycle at times when the extend bus cycle signal is activated by the responder node.

13. A node in accordance with claim 12 in which the bus access means includes:
a first circuit for asserting the system bus drive enable signal during the initial access cycle; and
a second circuit for extending the system bus drive enable signal while the extend bus cycle signal is activated.

14. A node in accordance with claim 10 wherein the node completes the transfer of the message during a last one of the bus cycles, and wherein the means for maintaining the extend request includes means for maintaining the extend request until the bus cycle preceding the last bus cycle.

15. A method by which a responder node obtains access to a pended bus, wherein the responder node is coupled to a commander request line, a responder request line, and a grant line corresponding exclusively to the responder node, wherein the responder node is coupled to each of a plurality of other nodes by the pended bus, wherein a node becomes a transmitter in order to transfer a message, including a command or including return data, on the pended bus during one or more cycles of the bus, wherein a commander node initiates a transaction on the pended bus by making a command transfer, wherein a responder node completes the transaction on the pended bus by making a return data transfer in response to the command transfer, and wherein a node can access the pended bus after the commander node initiates a transaction and before the responder node completes the transaction, the method comprising the steps of:

generating a responder bus request and transmitting the responder bus request on the responder request line at times when return data is to be transferred from the responder node onto the bus;

generating an extend request for the responder node at times when the responder node requires more than one bus cycle to transfer a message;

activating an extend bus cycle signal when the responder node becomes a transmitter at times when the extend request for the responder node is present;

obtaining control of the pended bus during an initial access cycle, in response to receipt of a conditional bus grant on the grant line, at times when an extend bus cycle signal is not activated by any of the other nodes; and maintaining control of the pended bus during bus cycles succeeding the initial access cycle at times when the extend bus cycle signal is activated by the responder node.

16. A method by which a node obtains access to a pended bus, wherein the node is coupled to a central arbiter by a commander request line, a responder request line, and a grant line corresponding exclusively to the node, wherein the central arbiter provides a conditional bus grant to a node generating a responder bus request prior to providing a conditional bus grant to a node generating a commander bus request, wherein the node is coupled to each of a plurality of other nodes by a shared extend bus cycle line and by the pended bus, wherein a node becomes a transmitter in order to transfer a message, including a command or including return data, on the pended bus during one or more cycles of the bus, wherein a commander node initiates a transaction on the pended bus by making a command transfer, wherein a responder node completes the transaction on the pended bus by making a return data transfer in response to the command transfer, and wherein a node can access the pended bus after the commander node initiates a transaction and before the responder node completes the transaction, the method comprising the steps of:

generating a commander bus request and synchronously transmitting the commander bus request on the commander request line at times when a command is to be transferred from the node onto the bus;

generating a responder bus request and synchronously transmitting the responder bus request on the responder request line at times when return data is to be transferred from the node onto the bus;

generating an extend request for the node at times when the node requires more than one bus cycle to transfer a message;

activating an extend bus cycle signal on the extend bus cycle line when the node becomes a transmitter at times when the extend request for the node is present;

obtaining control of the pended bus during an initial access cycle, in response to receipt of a conditional bus grant on the grant line, at times when an extend bus cycle signal is not activated on the extend bus cycle line by any of the other nodes; and maintaining control of the pended bus during bus cycles succeeding the initial access cycle at times when the extend bus cycle signal is activated by the node.

* * * * *